US012789974B2

(12) United States Patent
Chapla

(10) Patent No.: US 12,789,974 B2
(45) Date of Patent: Nov. 10, 2026

(54) FASTENING ARRANGEMENT FOR REDUCTION IN OBSERVABILITY

(71) Applicant: Raytheon Company, Tewksbury, MA (US)

(72) Inventor: Kevin M. Chapla, McKinney, TX (US)

(73) Assignee: RAYTHEON COMPANY, Tewksbury, MA (US)

( * ) Notice: Subject to any disclaimer, the term of this patent is extended or adjusted under 35 U.S.C. 154(b) by 179 days.

(21) Appl. No.: 18/738,850

(22) Filed: Jun. 10, 2024

(65) Prior Publication Data

US 2025/0376254 A1 Dec. 11, 2025

(51) Int. Cl.
*B64C 1/14* (2006.01)
*F16B 39/04* (2006.01)

(52) U.S. Cl.
CPC ............ *B64C 1/1484* (2013.01); *F16B 39/04* (2013.01)

(58) Field of Classification Search
CPC ....... B64C 1/1484; B64C 1/36; B64C 1/1492; F16B 39/04; F16B 5/0642; F16B 2/04; F16B 5/0258; F16B 7/025; F16B 29/00
See application file for complete search history.

(56) References Cited

U.S. PATENT DOCUMENTS

| | | | | |
|---|---|---|---|---|
| 2,834,998 | A | 5/1958 | Wilder | |
| 4,884,929 | A | 12/1989 | Smith et al. | |
| 5,391,028 | A | 2/1995 | Charles | |
| 5,603,472 | A | 2/1997 | Hutter, III | |
| 6,315,485 | B1 | 11/2001 | Speck et al. | |
| 8,701,260 | B1 | 4/2014 | Jacobsen | |
| 2007/0095984 | A1 * | 5/2007 | Wood | B64C 1/1492 244/129.3 |
| 2009/0028663 | A1 | 1/2009 | Stewart | |

FOREIGN PATENT DOCUMENTS

| | | | | |
|---|---|---|---|---|
| AU | 2021203268 | A1 * | 12/2021 | F16B 39/28 |
| WO | 2006121440 | A1 | 11/2006 | |
| WO | 2019164579 | A1 | 8/2019 | |

OTHER PUBLICATIONS

International Search Report and Written Opinion for PCT Application No. PCT/US2025/023878, dated Jul. 9, 2025, pp. 1-19.

* cited by examiner

*Primary Examiner* — Patrick J Maestri
(74) *Attorney, Agent, or Firm* — CANTOR COLBURN LLP

(57) ABSTRACT

An air vehicle structure includes a first component having a plurality of first component openings, and a second component positioned on the first component and having a plurality of second component openings aligned with the plurality of first component openings. A plurality of fasteners extend through the second component openings and into the plurality of first component openings to secure the second component to the first component. A cover assembly is installed over the second component covering the plurality of fasteners and includes a cover frame, and a plurality of wedge lock assemblies. Each wedge lock assembly is positioned at a second component opening of the plurality of second component openings. Each wedge lock assembly of the plurality of wedge lock assemblies are engaged to an interior surface of a corresponding second component opening of the plurality of second component openings to secure the cover assembly to the second component.

19 Claims, 5 Drawing Sheets

FASTENING ARRANGEMENT FOR REDUCTION IN OBSERVABILITY

GOVERNMENT LICENSE RIGHTS

This invention was made with Government support awarded by the United States. The Government has certain rights in the invention.

BACKGROUND

The present disclosure relates to aircraft structures and more particularly to reducing RF reflection from geometrical features associated with assembling a component to a substructions, such as fasteners, counterbores, countersinks and interfaces or seams between adjacent components.

Modern day air vehicles have requirements to limit the amount RF energy which can be reflected from their outer mold lines, or exterior surfaces. Meeting this requirement is typically achieved through shaping of geometry such that directed energy is reflected away from its source, as well as through the use of absorbing materials.

While macro-geometry of the shape can mitigate lower frequency reflections, the exterior of the air vehicle is still formed of a mosaic arrangement of panels, conformal apertures, windows, etc.; all of which must be attached to the structure, the latter two of which generally is accomplished via fasteners, such as screws, bolts or rivets. With these fasteners come associated panel supporting features, namely counterbores and countersinks and potentially extraneous seams. Along with the fastener features, all of these elements are higher frequency scattering mechanisms which must be dealt with to limit the reflected RF energy.

SUMMARY

In one exemplary embodiment, an air vehicle structure includes a first component having a plurality of first component openings, and a second component positioned on the first component and having a plurality of second component openings aligned with the plurality of first component openings. A plurality of fasteners extend through the second component openings and into the plurality of first component openings to secure the second component to the first component. A cover assembly is installed over the second component covering the plurality of fasteners. The cover assembly includes a cover frame, and a plurality of wedge lock assemblies. Each wedge lock assembly is positioned at a second component opening of the plurality of second component openings. Each wedge lock assembly of the plurality of wedge lock assemblies are engaged to an interior surface of a corresponding second component opening of the plurality of second component openings to secure the cover assembly to the second component.

Additionally or alternatively, in this or other embodiments a wedge lock of the plurality of wedge locks includes a fixed jaw secured to the cover frame and positioned on a lock axis, and a moving jaw disposed along the lock axis. A plurality of wedges are positioned along the lock axis between the fixed jaw and the moving jaw. A cover fastener is positioned at the lock axis and extends through the fixed jaw and into threaded engagement with the moving jaw, such that tightening the cover fastener into the moving jaw urges the plurality of wedges into engagement with the interior surface of the corresponding second component opening.

Additionally or alternatively, in this or other embodiments the fixed jaw includes one or more fixed jaw legs engaged with moving jaw to prevent rotation of the moving jaw about the lock axis relative to the fixed jaw.

Additionally or alternatively, in this or other embodiments a fastener head of the cover fastener is captured between the fixed jaw and the cover frame.

Additionally or alternatively, in this or other embodiments a biasing element is wrapped around the plurality of wedges.

Additionally or alternatively, in this or other embodiments the cover fastener is tightened via a corresponding cover opening in the cover frame.

Additionally or alternatively, in this or other embodiments a cover opening diameter of the cover opening is less than a second component opening diameter of the corresponding second component opening.

In another exemplary embodiment, a window assembly of an aircraft includes a window opening in a first component of an aircraft. The first component includes a plurality of first component openings arrayed around the window opening. The assembly further includes a window having a window pane, and a window frame at least partially surrounding the window pane. The window frame includes a plurality of window frame openings aligned with the plurality of first component openings. A plurality of fasteners extend through the window frame openings and into the plurality of first component openings to secure the window to the first component, and a cover assembly is installed over the window frame covering the plurality of fasteners. The cover assembly includes a cover frame, and a plurality of wedge lock assemblies. Each wedge lock assembly is positioned at a window frame opening of the plurality of window frame openings. Each wedge lock assembly of the plurality of wedge lock assemblies are engaged to an interior surface of a corresponding window frame opening of the plurality of window frame openings to secure cover assembly to the window frame.

Additionally or alternatively, in this or other embodiments a wedge lock of the plurality of wedge locks includes a fixed jaw secured to the cover frame and positioned on a lock axis, and a moving jaw disposed along the lock axis. A plurality of wedges are positioned along the lock axis between the fixed jaw and the moving jaw. A cover fastener is positioned at the lock axis and extends through the fixed jaw and into threaded engagement with the moving jaw, such that tightening the cover fastener into the moving jaw urges the plurality of wedges into engagement with the interior surface of the corresponding window frame opening.

Additionally or alternatively, in this or other embodiments the fixed jaw includes one or more fixed jaw legs engaged with moving jaw to prevent rotation of the moving jaw about the lock axis relative to the fixed jaw.

Additionally or alternatively, in this or other embodiments a fastener head of the cover fastener is captured between the fixed jaw and the cover frame.

Additionally or alternatively, in this or other embodiments a biasing element is wrapped around the plurality of wedges.

Additionally or alternatively, in this or other embodiments the cover fastener is tightened via a corresponding cover opening in the cover frame.

Additionally or alternatively, in this or other embodiments a cover opening diameter of the cover opening is less than a window frame opening diameter of the corresponding window frame opening.

Additionally or alternatively, in this or other embodiments a low observability coating is applied to the cover frame.

Additionally or alternatively, in this or other embodiments a seal is positioned between the window frame and the first component.

In yet another exemplary embodiment, an aircraft includes an aircraft structure including an opening, and a component configured to cover the opening having a plurality of component openings. A plurality of fasteners extend through the component openings and into the aircraft structure to secure the component to the aircraft structure. A cover assembly is installed over the component covering the plurality of fasteners. The cover assembly includes a cover frame and a plurality of wedge lock assemblies. Each wedge lock assembly is positioned at a component opening of the plurality of component openings. Each wedge lock assembly of the plurality of wedge lock assemblies are engaged to an interior surface of a corresponding component opening of the plurality of component openings to secure the cover assembly to the component.

Additionally or alternatively, in this or other embodiments a wedge lock of the plurality of wedge locks includes a fixed jaw secured to the cover frame and positioned on a lock axis, and a moving jaw positioned along the lock axis. A plurality of wedges are positioned along the lock axis between the fixed jaw and the moving jaw. A cover fastener is positioned at the lock axis and extends through the fixed jaw and into threaded engagement with the moving jaw, such that tightening the cover fastener into the moving jaw urges the plurality of wedges into engagement with the interior surface of the corresponding component opening.

Additionally or alternatively, in this or other embodiments the cover fastener is tightened via a corresponding cover opening in the cover frame.

Additionally or alternatively, in this or other embodiments a cover opening diameter of the cover opening is less than a window frame opening diameter of the corresponding window frame opening.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method are presented herein by way of exemplification and not limitation with reference to the Figures.

Figure 1:
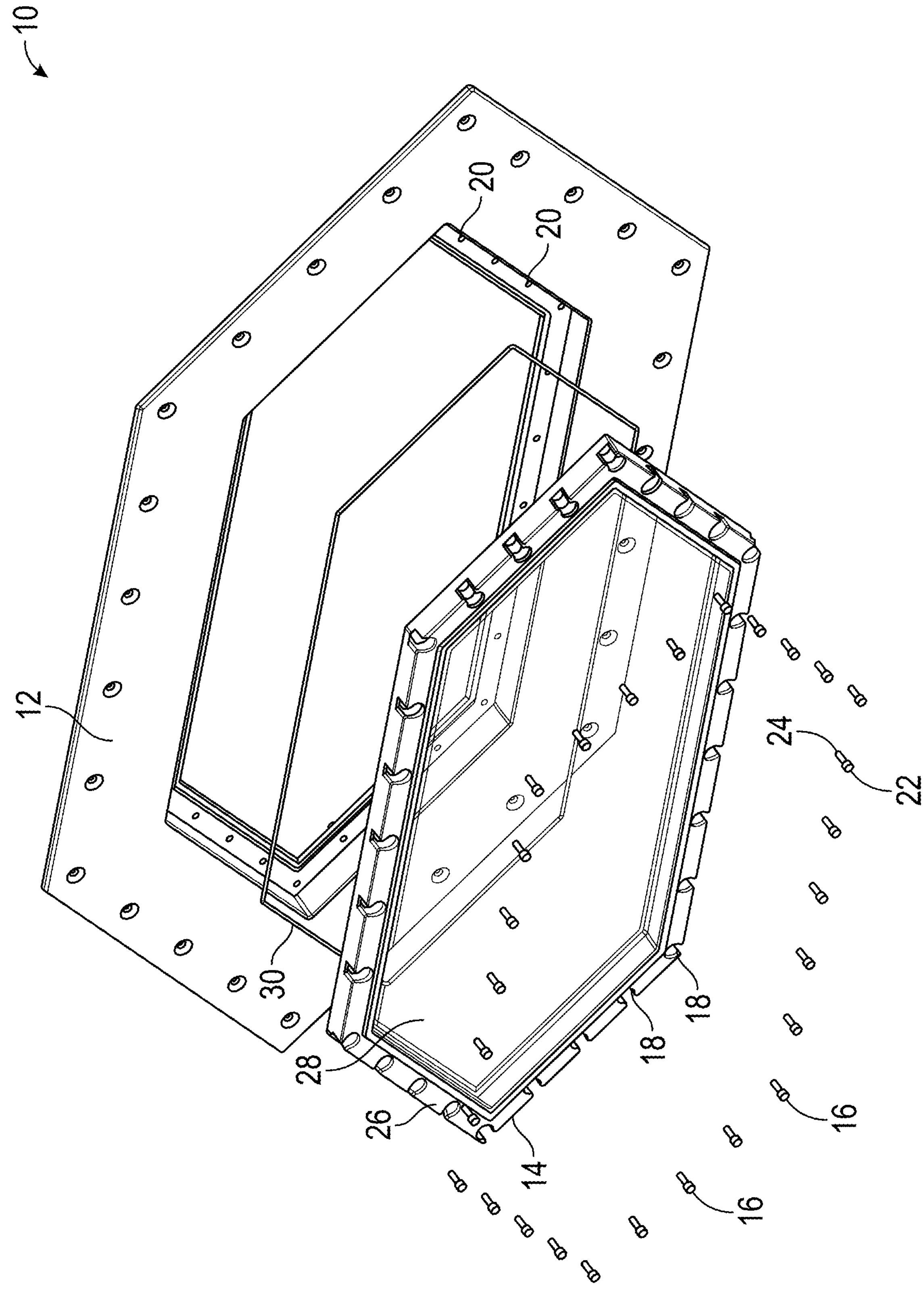
FIG. 1 is a schematic illustration of an embodiment of air vehicle structure.

Referring now to FIG. 1, illustrated is an embodiment of an air vehicle structure 10. The air vehicle structure 10, includes a first component 12, such as a fuselage, and a second component 14, such as a cover, a window, or a dome, installed to the first component 12. As illustrated, the second component 14 is installed to the first component 12 via a plurality of fasteners 16 arrayed around a perimeter of the second component 14. The plurality of fasteners 16 extend through a corresponding plurality of second component openings 18 in the second component 14 and into a corresponding plurality of first component openings 20 in the first component 12. In some embodiments, the plurality of fasteners 16 are a plurality of bolts having a bolt head 22 and a bolt shaft 24, which is threaded. In some embodiments, the first components openings 20 and/or the second component openings 18 may have complimentary threads configured to engage the threads of the plurality of fasteners. In some embodiments the second component openings 18 are counterbored, such that the bolt head 22 is located inside of the counterbore. While in the illustrated embodiments the plurality of fasteners 16 are bolts, in other embodiments the plurality of fasteners 16 may include other fasteners such as screws or rivets.

As previously stated, in some embodiments the second component 14 is a window having a window frame 26 and a window pane 28. Additionally, in some embodiments a seal 30 may be installed between the second component 14 and the first component 12. While the embodiments described and illustrated in detail herein relate to windows, one skilled in the art will readily appreciate that those embodiments are merely exemplary, and that the present disclosure could be readily applied to other configurations of second components 14, such as covers, domes, or the like.

Figure 2:
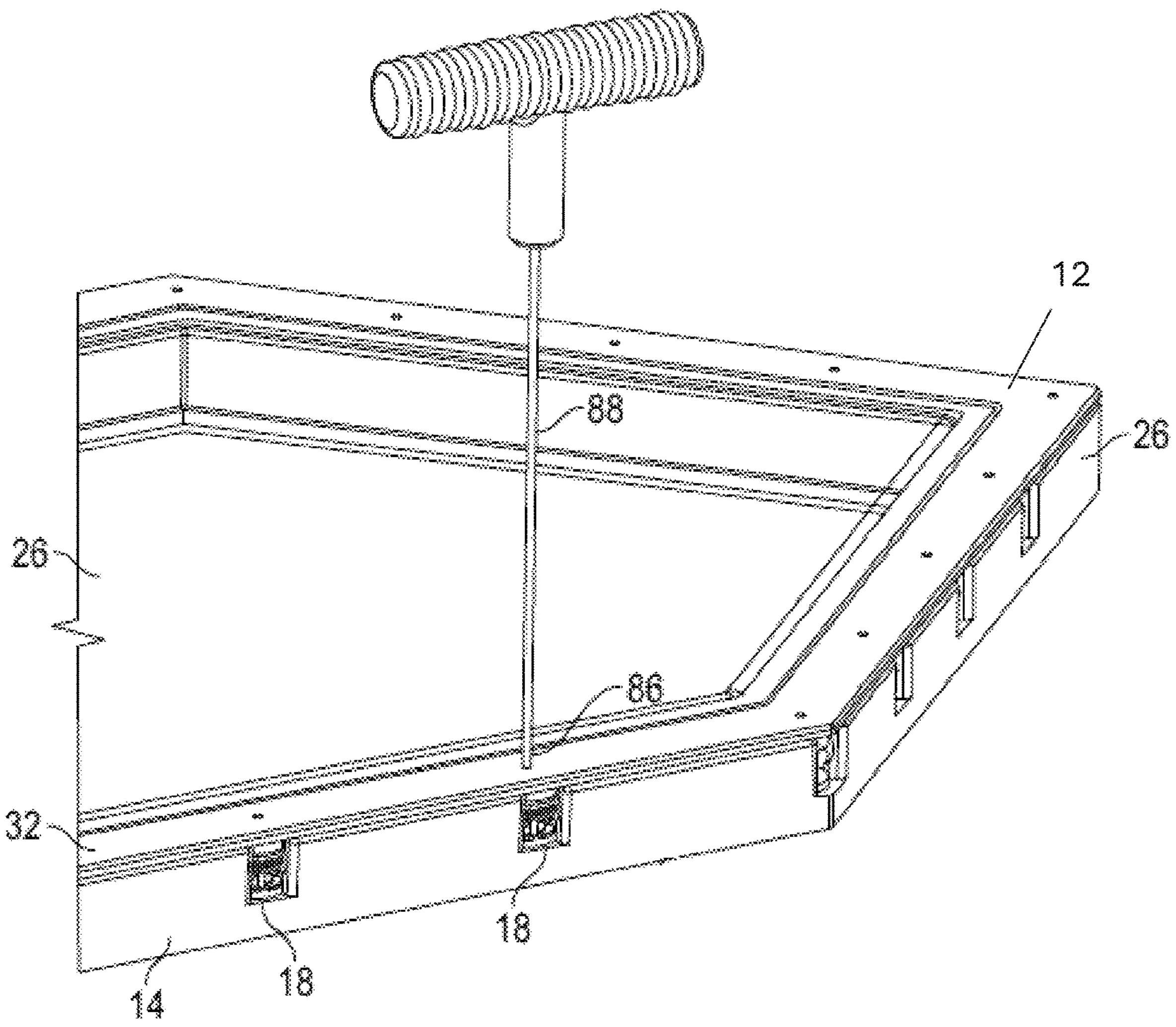
FIG. 2 is a partial perspective illustration of an embodiment of an air vehicle structure having a cover installed thereto.
Figure 3:
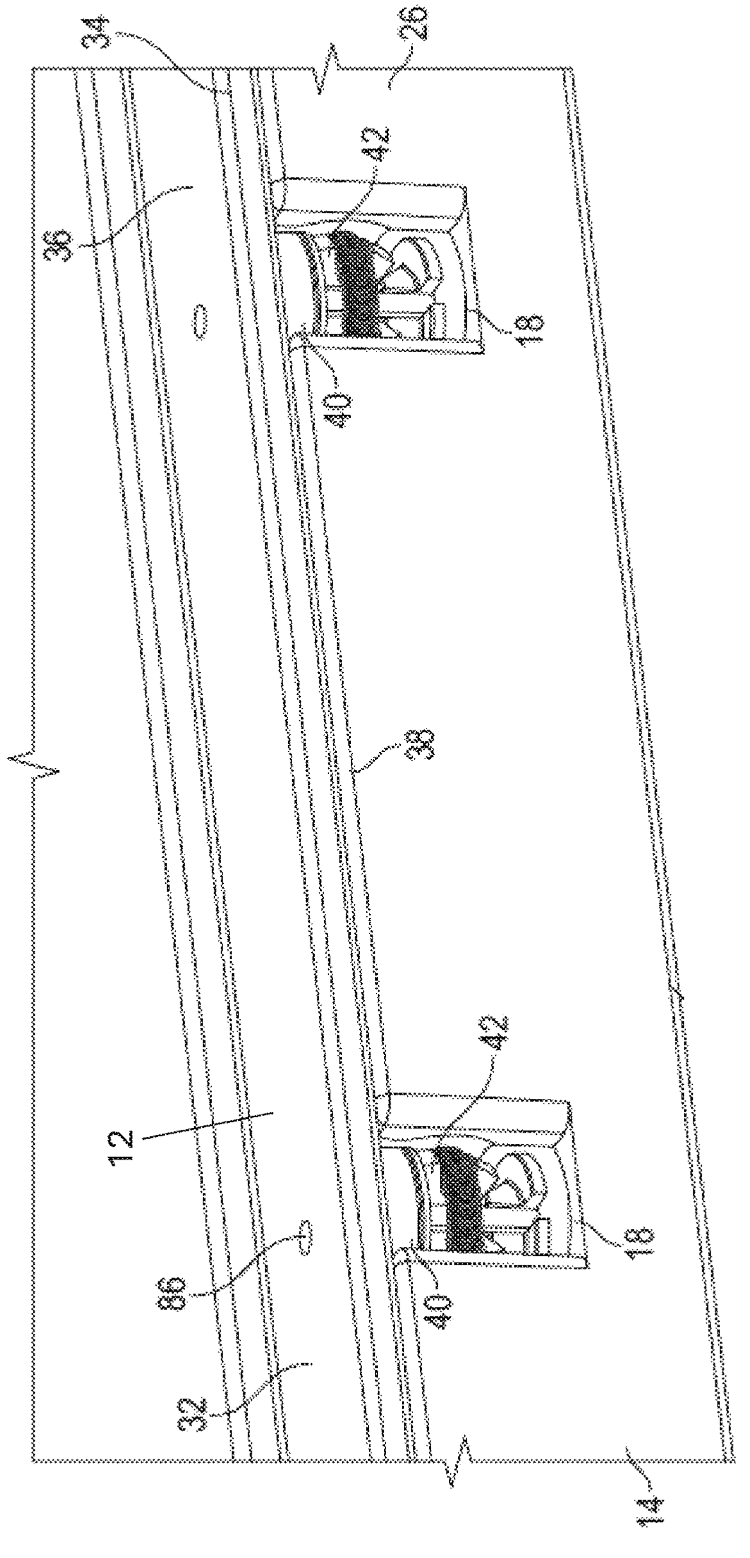
FIG. 3 is a partial cross-sectional view of an embodiment of an air vehicle structure having a cover installed thereto.

Referring now to FIG. 2, to reduce the RF observability of the structure 10, a cover 32 is installed over the second component 14, more specifically over the window frame 26, covering the second component openings 18 and the bolt heads 22. In some embodiments, the cover 32 includes a low observability coating applied thereto to reduce the RF observability of the cover 32, compared to an uncoated cover. As better shown in FIG. 3, the cover includes a cover frame 34 having an outer cover surface 36 and an inner cover surface 38 opposite the outer cover surface 36. A plurality of cover bodies 40 extend from the inner cover surface 38 into the second component openings 18, with a wedge lock 42 device installed to each of the cover bodies 40, which are engaged into the second component openings 18 to secure the cover 32 to the second component 14.

Referring now to the cross-sectional views of FIGS. 4 and 5 and the partially disassembled view of FIG. 6, the wedge lock 42 and the engagement thereof will be described in greater detail. The wedge lock 42 includes a fixed jaw 44 installed and secured to the cover body 40. In some embodiments, the cover body 40 is cylindrical about a lock axis 70 and the fixed jaw 44 is installed in secured at least partially inside the cover body 40. This may be achieved by, for example, a threaded or bonded interface between the cover body 40 and a jaw head 46 of the fixed jaw 44. The fixed body 44 further includes a fixed jaw flange 48 extending outwardly from the jaw head 46 and a fixed jaw opening 50 located at the lock axis 70 and through which a cover fastener 52 extends. The fixed jaw flange 48 aids in positioning the fixed jaw 44 relative to the cover body 40. When the fixed jaw 44 is installed to the cover body 40, the cover fastener 52, in particular a fastener head 54 of the cover fastener 52, is captured therebetween. A threaded fastener shaft 56 of the cover fastener 52 extends through the fixed jaw opening 50 along the lock axis 70. The fixed jaw 44 further includes two opposing fixed jaw legs 58 that extend from the jaw head 46, in some embodiments, perpendicular to the fixed jaw flange 48. The fixed jaw legs 58 are located on opposite sides of the fastener shaft 56.

A moving jaw, for example, a sliding jaw 60, is installed onto the fastener shaft 56 via a jaw thread 62 complimentary to the threads of the fastener shaft 56. The sliding jaw 60 includes jaw slots 64 into which the fixed jaw legs 58 extend to rotationally lock the sliding jaw 60 about the lock axis 70, relative to the fixed jaw 44. The sliding jaw 60 has a sliding jaw base 66 and conical sliding jaw body 68 that extends from the sliding jaw base 66 along the lock axis 70 toward the fixed jaw 44. A wedge clamp assembly 72 is located at the lock axis 70 between the fixed jaw 44 and the sliding jaw 60. The wedge clamp assembly 72 includes two wedges 74 retained about the lock axis 70 by a garter spring 76 extending about an outer perimeter of the wedges 74. While embodiments with two wedges 74 are described and illustrated herein, one skilled in the art will readily appreciate that other embodiments may utilize three or more wedges 74. Further, while a garter spring 76 is illustrated and described herein, this is merely exemplary. One skilled in the art will readily appreciate that other configurations of biasing elements, such as other spring configurations, elastomeric elements, O-rings, or the like may be utilized.

The wedges 74 each include a wedge interface surface 78 that is conically shaped to engage the sliding jaw body 68 and also includes a wedge groove 80 defined in a wedge radially outer surface 82 to retain the garter spring 76 around the wedges 74. An end clip 84 is installed onto the fastener shaft 56 after the wedges 74 and the sliding jaw 60 are installed to prevent the sliding jaw 60 from falling off the fastener shaft 56.

Figure 4:
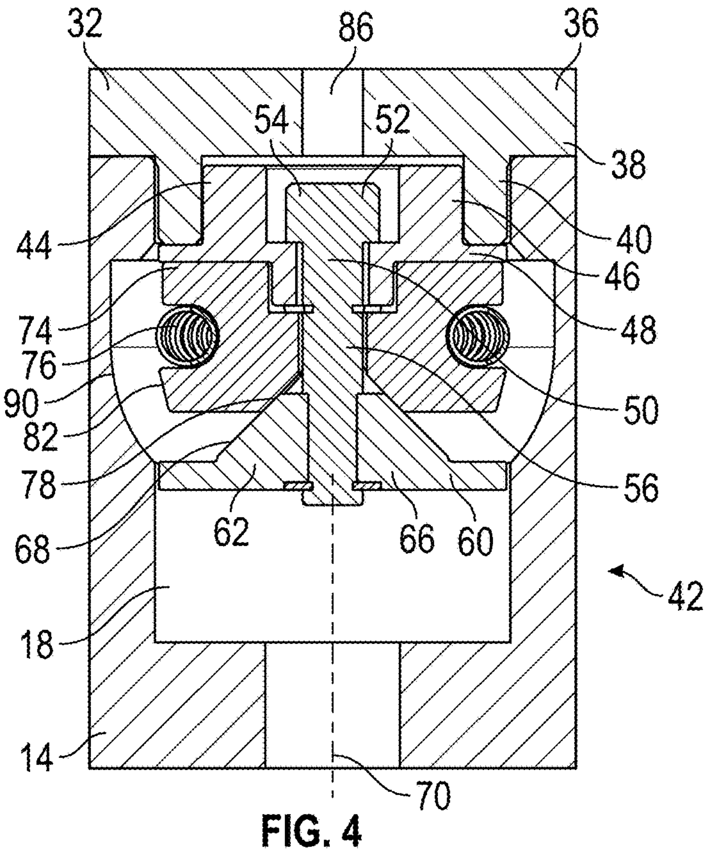
FIG. 4 is a first cross-sectional view of an embodiment of a wedge lock assembly.
Figure 5:
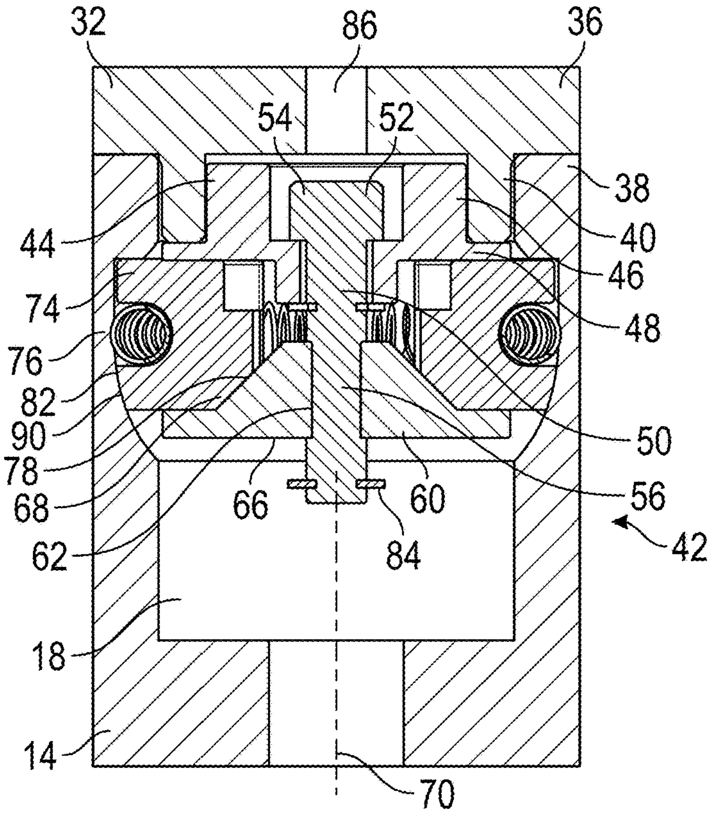
FIG. 5 is a second cross-sectional view of an embodiment of a wedge lock assembly.
Figure 6:
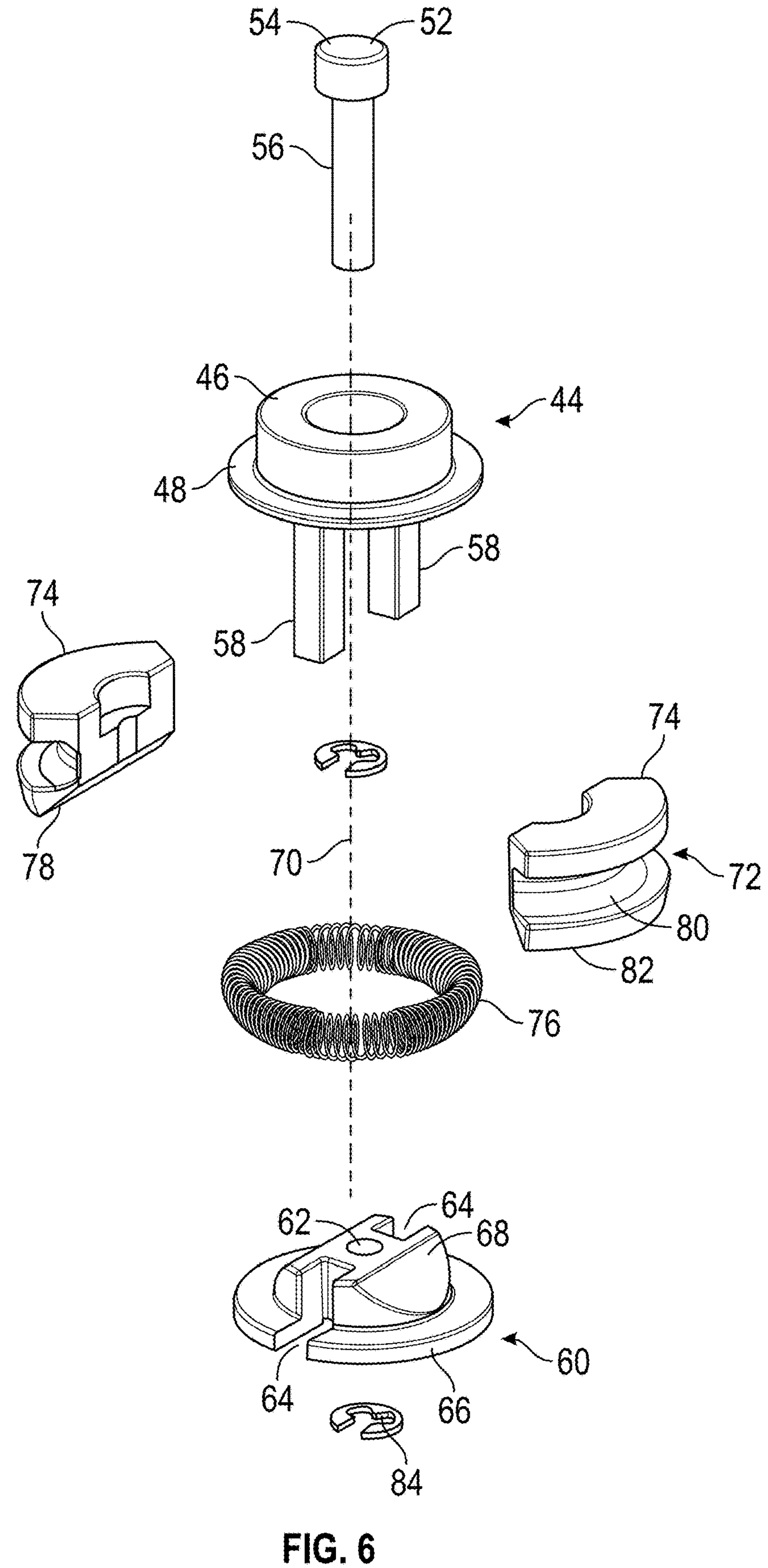
FIG. 6 is a partially disassembled view of an embodiment of a wedge lock assembly.

Referring now in particular to FIGS. 4 and 5, the cover frame 36 includes frame openings 86 through which the fastener head 54 is accessible by an installation tool 88. In some embodiments, the cover fastener 52 is a hex screw, but one skilled in the art will readily appreciate that other fastener head 54 configurations may be utilized. The frame opening 86 has a smaller opening diameter than the second component opening 18 over which the cover frame 36 is installed, which aids in reducing the RF observability of the structure 10. Further, in some embodiments the frame opening 86 is sized to be smaller in diameter than the fastener head 54 and may also be sized to cut off any RF frequencies of interest.

The wedge lock 40 is engaged to an inner surface 90 of the second compartment opening 18 by tightening the cover fastener 52 into the jaw thread 62 of the sliding jaw 60 utilizing the installation tool 88. As illustrated in FIG. 5, the tightening of the cover fastener 52 draws the sliding jaw 60 toward the wedges 74, which causes the sliding jaw body 68 to move along wedge interface surface 78 of the wedges 74. This in turn urges the wedges 74 radially outwardly such that the wedge radially outer surface 82 engages with the inner surface 90 to frictionally secure the wedges 74 thereat, thereby securing the cover 32 to the second component 14. The cover 32 may be removed by reversing the rotation of the cover fastener 52 thus disengaging the wedges 72 from the inner surface 90 of the second component opening 18.

The cover 32 configurations installed via the wedge locks 40 addresses the problem of RF reflection from geometrical features associated with assembling a component to a substructure; for instance, fasteners, counterbores and countersinks, and interfaces (seams) between components. Further, the cover 32 is a removable and reusable means of achieving the solution described.

Additionally, the cover 32 and wedge locks 40 reduces aerodynamic drag resulting from geometries described above and is a method of structurally attaching a fairing to an air vehicle; which is reversible and reusable.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. An air vehicle structure, comprising:

a first component having a plurality of first component openings;

a second component positioned on the first component and having a plurality of second component openings aligned with the plurality of first component openings;

a plurality of fasteners extending through the second component openings and into the plurality of first component openings to secure the second component to the first component;

a cover assembly installed over the second component covering the plurality of fasteners, the cover assembly including:

a cover frame; and a plurality of wedge lock assemblies, each wedge lock assembly positioned at a second component opening of the plurality of second component openings;

wherein each wedge lock assembly of the plurality of wedge lock assemblies are engaged to an interior surface of a corresponding second component opening of the plurality of second component openings to secure the cover assembly to the second component;

wherein a wedge lock assembly of the plurality of wedge lock assemblies includes:

a fixed jaw secured to the cover frame and positioned on a lock axis;

a moving jaw disposed along the lock axis;

a plurality of wedges disposed along the lock axis between the fixed jaw and the moving jaw; and a cover fastener disposed at the lock axis and extending through the fixed jaw and into threaded engagement with the moving jaw, such that tightening the cover fastener into the moving jaw urges the plurality of wedges into engagement with the interior surface of the corresponding second component opening.

2. The air vehicle structure of claim 1, wherein the fixed jaw includes one or more fixed jaw legs engaged with the moving jaw to prevent rotation of the moving jaw about the lock axis relative to the fixed jaw.

3. The air vehicle structure of claim 1, wherein a fastener head of the cover fastener is captured between the fixed jaw and the cover frame.

4. The air vehicle structure of claim 1, further comprising a biasing element wrapped around the plurality of wedges.

5. The air vehicle structure of claim 1, wherein the cover fastener is tightened via a corresponding cover opening in the cover frame.

6. The air vehicle structure of claim 5, wherein a cover opening diameter of the cover opening is less than a second component opening diameter of the corresponding second component opening.

7. A window assembly of an aircraft, comprising:
- a window opening in a first component of an aircraft, the first component including a plurality of first component openings arrayed around the window opening;
- a window including:
  - a window pane; and
  - a window frame at least partially surrounding the window pane, the window frame including a plurality of window frame openings aligned with the plurality of first component openings;
  - a plurality of fasteners extending through the window frame openings and into the plurality of first component openings to secure the window to the first component;
  - a cover assembly installed over the window frame covering the plurality of fasteners, the cover assembly including:
    - a cover frame; and
    - a plurality of wedge lock assemblies, each wedge lock assembly positioned at a window frame opening of the plurality of window frame openings;
    - wherein each wedge lock assembly of the plurality of wedge lock assemblies are engaged to an interior surface of a corresponding window frame opening of the plurality of window frame openings to secure cover assembly to the window frame.

8. The window assembly of claim 7, wherein a wedge lock assembly of the plurality of wedge lock assemblies includes:
- a fixed jaw secured to the cover frame and positioned on a lock axis;
- a moving jaw disposed along the lock axis;
- a plurality of wedges disposed along the lock axis between the fixed jaw and the moving jaw; and
- a cover fastener disposed at the lock axis and extending through the fixed jaw and into threaded engagement with the moving jaw, such that tightening the cover fastener into the moving jaw urges the plurality of wedges into engagement with the interior surface of the corresponding window frame opening.

9. The window assembly of claim 8, wherein the fixed jaw includes one or more fixed jaw legs engaged with the moving jaw to prevent rotation of the moving jaw about the lock axis relative to the fixed jaw.

10. The window assembly of claim 8, wherein a fastener head of the cover fastener is captured between the fixed jaw and the cover frame.

11. The window assembly of claim 8, further comprising a biasing element wrapped around the plurality of wedges.

12. The window assembly of claim 8, wherein the cover fastener is tightened via a corresponding cover opening in the cover frame.

13. The window assembly of claim 12, wherein a cover opening diameter of the cover opening is less than a window frame opening diameter of the corresponding window frame opening.

14. The window assembly of claim 7, further comprising a low observability coating applied to the cover frame.

15. The window assembly of claim 7, further comprising a seal disposed between the window frame and the first component.

16. An aircraft comprising:
- an aircraft structure including an opening;
- a component configured to cover the opening having a plurality of component openings;
- a plurality of fasteners extending through the component openings and into the aircraft structure to secure the component to the aircraft structure;
- a cover assembly installed over the component covering the plurality of fasteners, the cover assembly including:
  - a cover frame; and
  - a plurality of wedge lock assemblies, each wedge lock assembly positioned at a component opening of the plurality of component openings;
  - wherein each wedge lock assembly of the plurality of wedge lock assemblies are engaged to an interior surface of a corresponding component opening of the plurality of component openings to secure the cover assembly to the component.

17. The aircraft of claim 16, wherein a wedge lock assembly of the plurality of wedge assemblies includes:
- a fixed jaw secured to the cover frame and positioned on a lock axis;
- a moving jaw disposed along the lock axis;
- a plurality of wedges disposed along the lock axis between the fixed jaw and the moving jaw; and
- a cover fastener disposed at the lock axis and extending through the fixed jaw and into threaded engagement with the moving jaw, such that tightening the cover fastener into the moving jaw urges the plurality of wedges into engagement with the interior surface of the corresponding component opening.

18. The aircraft of claim 17, wherein the cover fastener is tightened via a corresponding cover opening in the cover frame.

19. The aircraft of claim 18, wherein a cover opening diameter of the cover opening is less than a window frame opening diameter of the corresponding window frame opening.

* * * * *